United States Patent
Rothrock

(10) Patent No.: US 6,701,980 B2
(45) Date of Patent: Mar. 9, 2004

(54) MOBILE FUELING ASSEMBLY

(75) Inventor: Guy G. Rothrock, Petaluma, CA (US)

(73) Assignee: Nova Group, Inc, Napa, CA (US)

( * ) Notice: Subject to any disclaimer, the term of this patent is extended or adjusted under 35 U.S.C. 154(b) by 0 days.

(21) Appl. No.: 10/162,483

(22) Filed: Jun. 3, 2002

(65) Prior Publication Data

US 2003/0221747 A1 Dec. 4, 2003

(51) Int. Cl.[7] ................................................. B65B 1/04
(52) U.S. Cl. ....................... 141/231; 141/387; 141/279; 137/615
(58) Field of Search ................................ 141/231, 279, 141/384, 387, 389; 137/615

(56) References Cited

U.S. PATENT DOCUMENTS

| | | | |
|---|---|---|---|
| 2,531,001 A | 11/1950 | Short | 222/176 |
| 3,724,499 A | 4/1973 | Huntu | 137/615 |
| 3,891,004 A | 6/1975 | Knight | 137/615 |
| 4,130,134 A | 12/1978 | Castle | 137/615 |
| 4,202,372 A | * 5/1980 | Gibbons | 137/615 |
| 4,231,398 A | * 11/1980 | Gibbons | 137/615 |
| 4,658,873 A | 4/1987 | Meyerinck et al. | 141/387 |
| 4,844,133 A | 7/1989 | Meyerinck et al. | 141/387 |
| 4,993,463 A | * 2/1991 | von Meyerinck et al. | 141/387 |

* cited by examiner

*Primary Examiner*—Steven O. Douglas
(74) *Attorney, Agent, or Firm*—Coudert Brothers LLP

(57) ABSTRACT

A fueling assembly for use in the transfer of fuel is disclosed. The assembly includes a platform and a plurality of swivel joints and pipe sections. The assembly can be folded onto and supported by the platform, and can be unfolded to extend away from the platform. A vertically-moving assembly and a horizontally-moving assembly are provided, each including two swivel joints and connected to each other by an elbow pipe. A coupler may be attached to one of the swivel joints for releasable coupling with a fueling assembly, and for receiving fuel from the fueling assembly. The hydrant may be attached to a pantograph or to any mobile pipeline or mobile pipe segment.

30 Claims, 5 Drawing Sheets

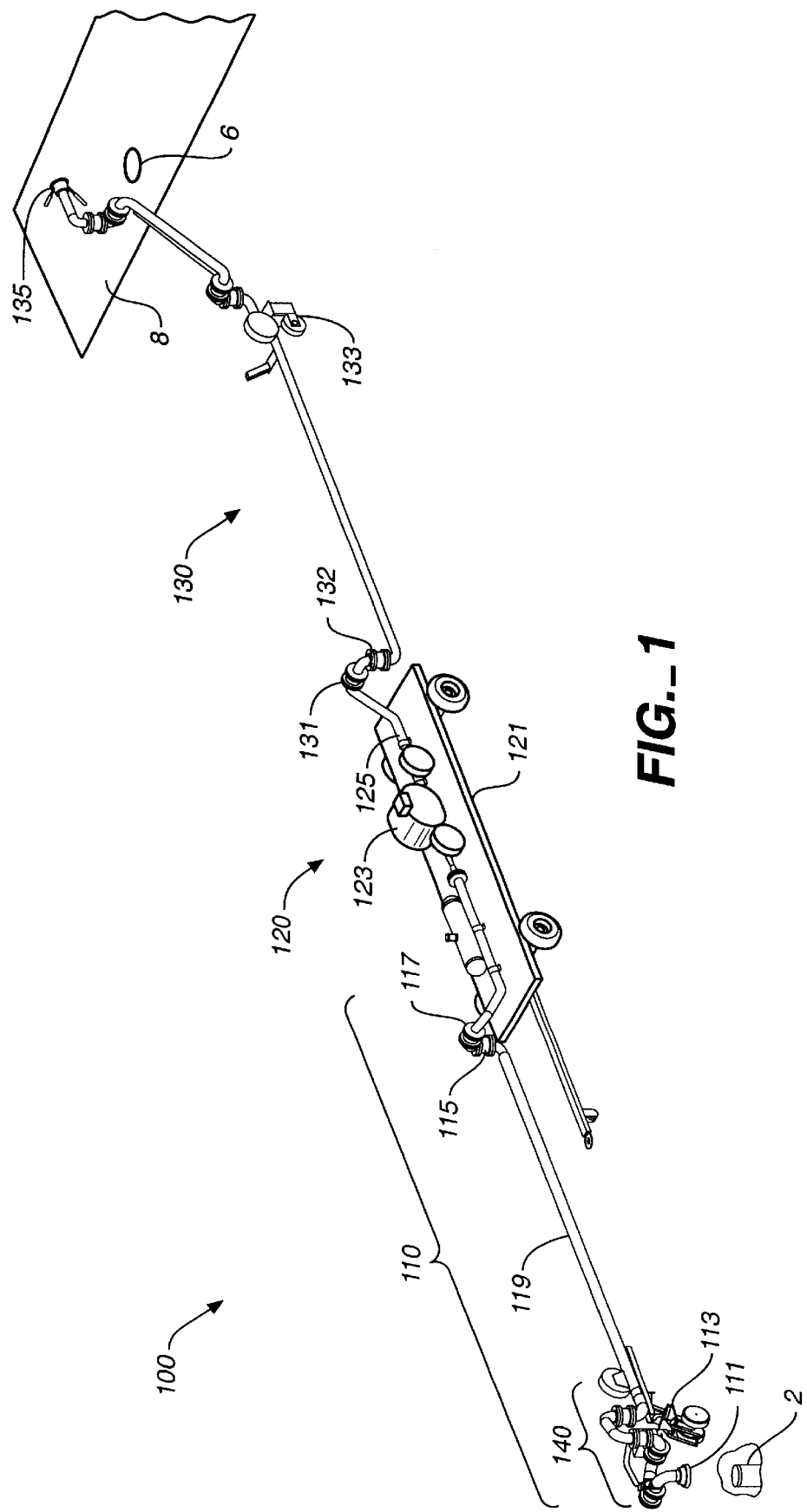
FIG._1

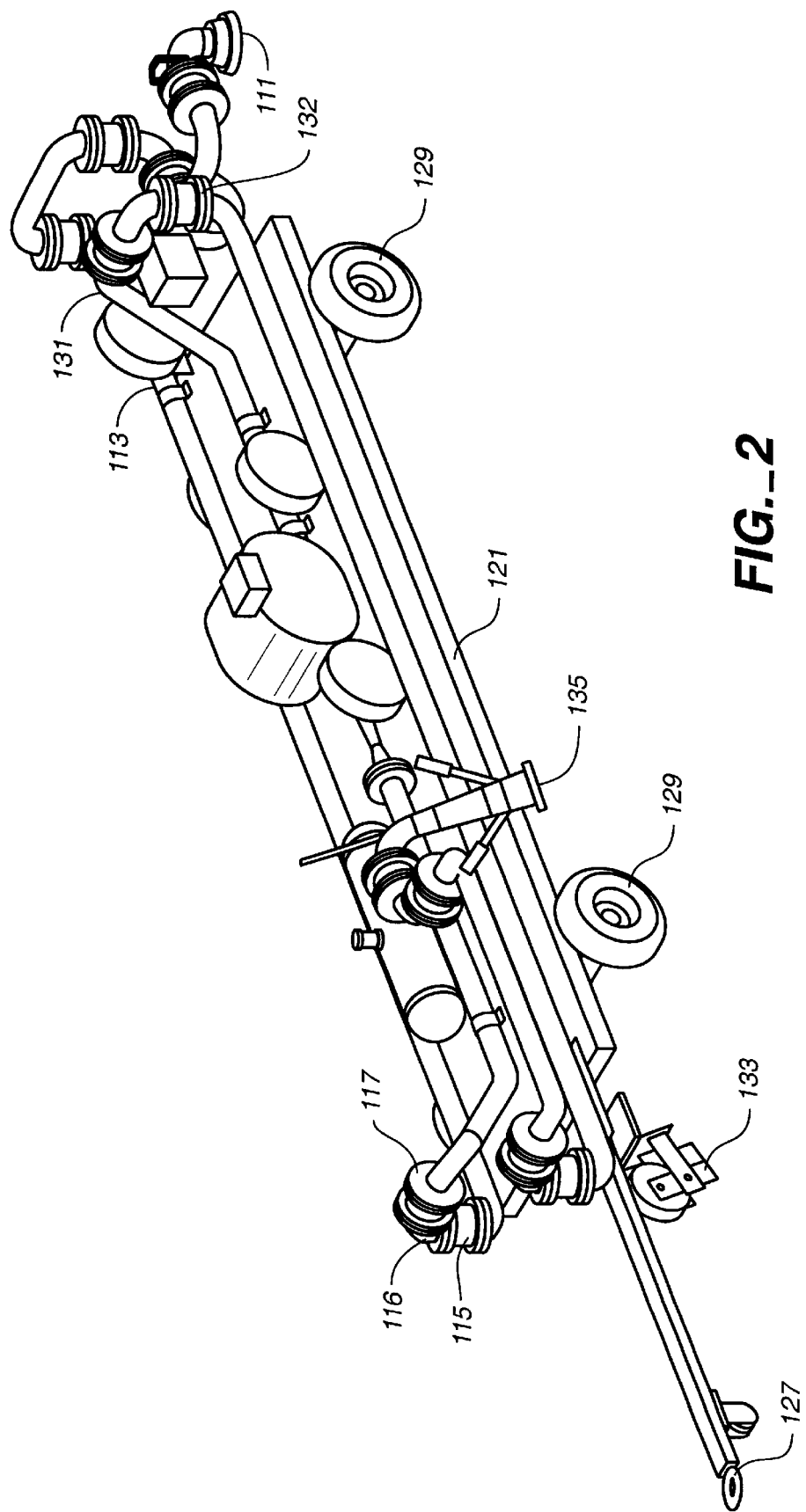
FIG._2

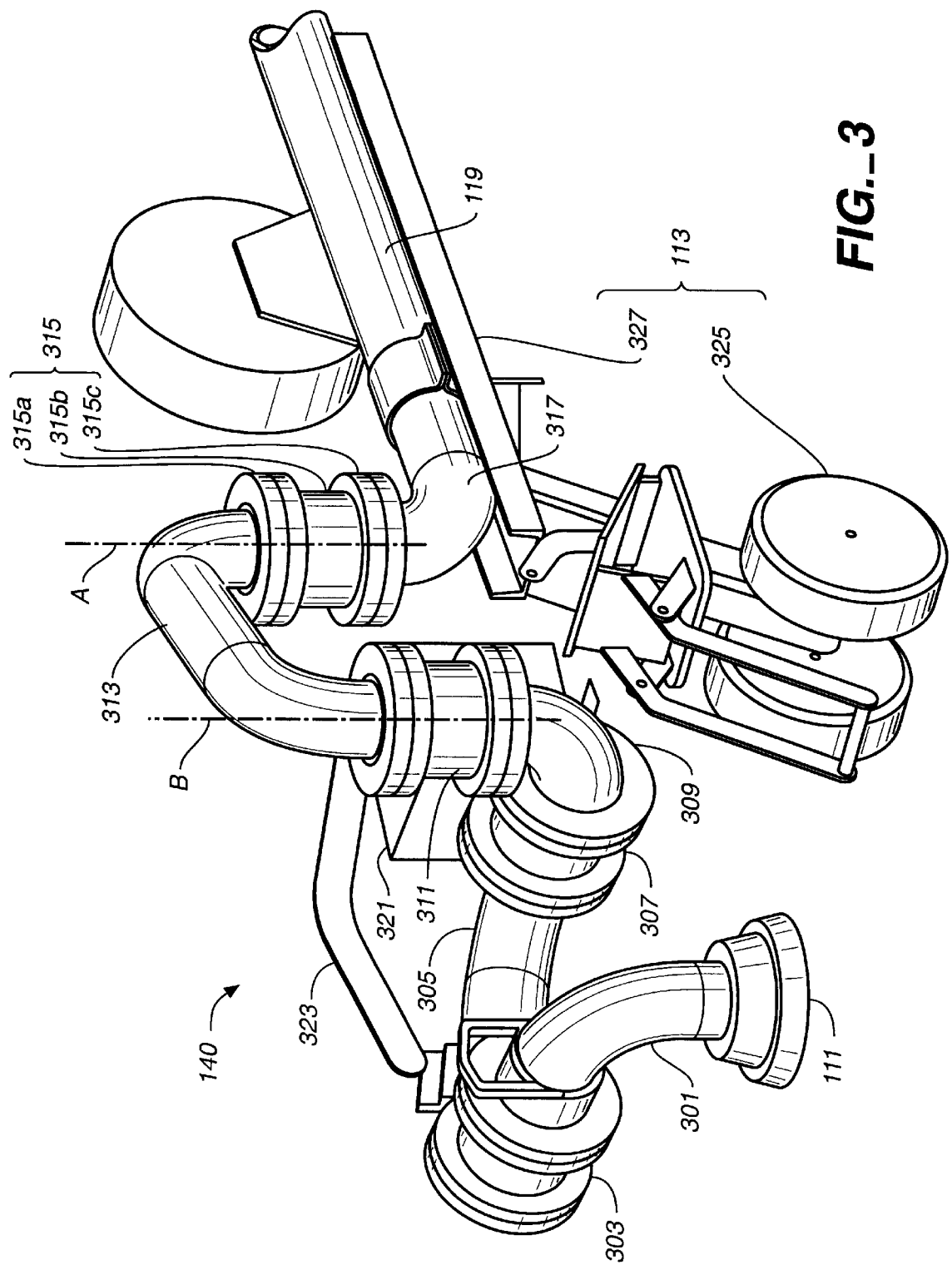
FIG._3

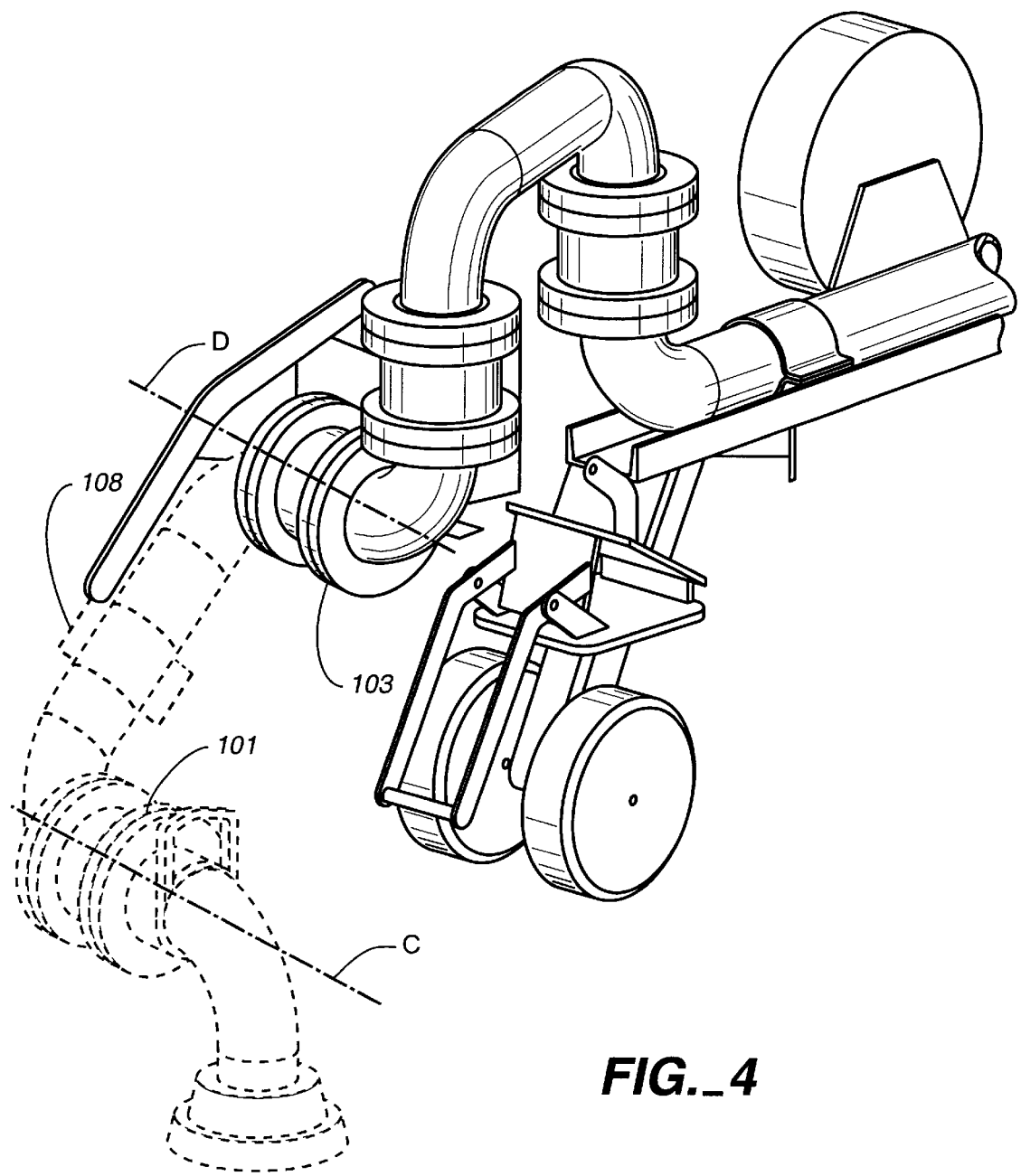
FIG._4

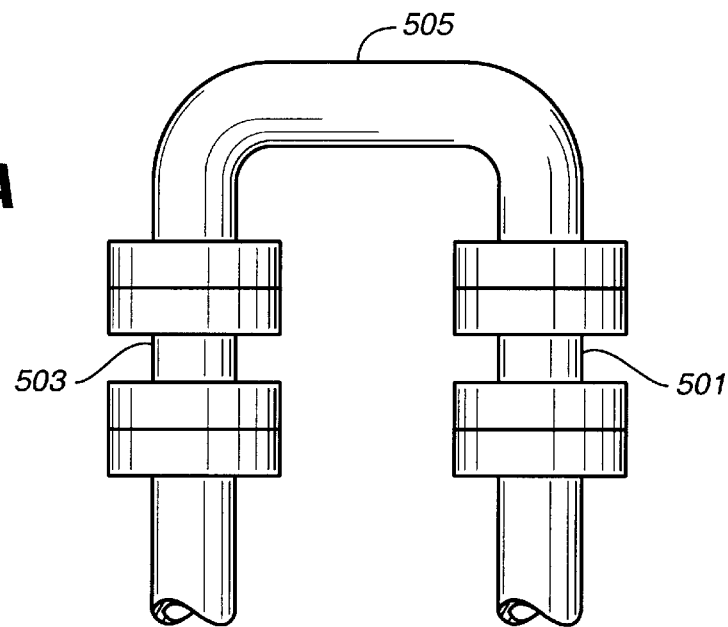
FIG._5A
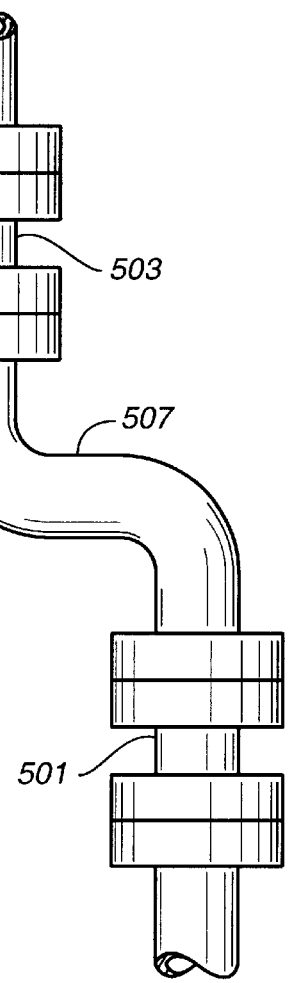
FIG._5B

MOBILE FUELING ASSEMBLY

FIELD OF THE INVENTION

The present invention relates to a mobile fueling assembly comprised of pipes and swivel joints and, in particular, to an assembly having two pairs of swivel joints and sections of curved pipe therebetween to provide for the independent horizontal and vertical movement of the assembly.

BACKGROUND OF THE INVENTION

Aircraft fueling operations require the rapid transport of fuel from a storage tank to the aircraft. Generally, fuel is available from a hydrant that may be located in a region of restricted mobility, for example, as a subterranean hydrant located below the surface of an airfield. In the past, flexible hoses have been used to acquire fuel from fueling hydrants (see, e.g., U.S. Pat. No. 2,531,001 to Short). Flexible hoses have been made of fabric, rubber, and other polymers. The use of hoses to fuel aircraft presents many difficulties, including the lifting of the hose and the support of the weight of the hose and fuel contained therein. Thus the practical use of hoses is restricted to lightweight, narrow diameter flexible hoses. Other problems with flexible hoses is that aging and abrasion reduce the hose lifetime, and the high-pressure pumping of fuel results in stretching of the hose and a resultant lack of flexibility.

Fueling systems comprised of a succession of metal components, such as pipes, swivel joints, and couplings, are known in the art for the rapid fueling of vehicles. These fueling systems typically include a conduit having multiple curved pipe sections, where the ends of adjoining pipe sections are joined by swivel joints. The adjoining ends of each pair of adjacent pipe sections each have a circular cross-section and a common axis, and the swivel joint allows the two pipe sections to rotate about a common axis (the "axis of rotation" of the swivel joint). When one or both pipe sections adjacent to a swivel joint are curved, rotation about the axis of rotation results in an out-of-plane rotation of the pipe. In many fueling systems the curved pipe sections will have 90° or 180° bends, and thus the swivel joints allow the piping system to move in one plane, or in two or three mutually perpendicular planes.

Fueling systems having many metal components can be very heavy, and are typically mounted on the ground (see, e.g., U.S. Pat. No. 3,891,004 to Knight), on a wheeled carrier, such as a motorized truck (U.S. Pat. No. 4,130,134 to Castle), on a carriage (U.S. Pat. No. 4,844,133 to von Meyerinck, et al.), or on a plurality of carriages (U.S. Pat. No. 4,658,873 to von Meyerinck, et al.).

When a wheeled carrier is used, the carrier and wheels are a source of weight and inertia that must be maneuvered in addition to the metal pipes and swivel joints. Positioning a wheeled carrier to enable mating the hydrant assembly with a hydrant can be difficult due to the inertia of starting and stopping the carrier and the difficulty of steering the carriage wheels. Positioning the wheeled carrier for mating is also difficult due to the inability of operators to simultaneously move the carrier and view the position of the coupling, especially where the hydrant is subterranean. As a result, a wheeled carrier system using metal components is less maneuverable than a flexible hose system.

The use of inflexible pipe segments in connecting fueling systems to a hydrant is accomplished, in some systems, by a hydrant assembly having multiple swivel joints oriented with mutually parallel axes of rotation. In several prior art references, the rotation of the swivel joints cooperates with the shape of curved pipe segments to allow the pipe between the swivel joints to rotate in a plane perpendicular to the axis of rotation. One prior art reference discloses a first pair of parallel swivel joints followed by a second pair of parallel swivel joints, where the axes of rotation of all of the swivel joints are all parallel to each other. The swivel joints facilitate the extension of a conduit or jib.

Another prior art reference includes three or more loading arms for loading fuel in a truck, wherein each loading arm is attached to a storage reservoir and has a free end for attaching to the truck. Each arm includes a pair of swivel joints whose axis of rotation are parallel, followed by a second pair of swivel joints having parallel axis of rotation that are perpendicular to the axes of rotation of the first pair. The positioning of the plurality of arms having staggered swivel joints and curved pipe sections allows a plurality of loading arms to be used independently without interfering with the movement of one another, and allows for a plurality of different tanks to be fueled at the same time. Also included in this reference is a counterbalance mechanism associated with one of the swivel joints that allows easier horizontal movement of the free end of the loading arm, thus permitting easier manipulation of the free end.

Another reference describes a pair of adjacent swivel joints having parallel axis of rotation and having curved pipe sections positioned near a hydrant coupling. These swivel joints cooperate with the curved pipe sections to facilitate horizontal adjustments of a hydrant coupling in order to enable the coupling to mate with a hydrant. An additional pair of swivel joints having parallel axes of rotation in a plane perpendicular to the first pair is also described, allowing movement of the hydrant coupling in a vertical plane. While this assembly permits movement of the hydrant coupling in two perpendicular planes, the additional pair of swivel joints are separated by a carriage and by an additional swivel joint. In addition, while a counterbalance mechanism is included to balance the rotational force on one of the swivel joints resulting from the weight of the components, the second pair of swivel joints rotate independently with one another. The independent rotation of the second pair of swivel joints can result in some maneuverability problems, especially within a confined space.

Another reference describes a fluid conveyor system useful for extending delivery to a controllable height. The system has a plurality of swivel joints having parallel axis of rotation joining pipe sections having a combined curved and straight pipe section between the swivel joints that execute a 180° bend between successive swivel joints. The swivel joints are constrained to move laterally from one another, and the arrangement allows for the elongation of the fluid conveyor system by laterally increasing the spacing of the swivel joints. The fluid conveyor system thus provides an apparatus for controlling the spacing of one end of the system relative to the other along a single axis. The swivel joint assembly does not provide for easily moving the assembly in a direction perpendicular to the single axis.

In general, the prior art solutions for transporting large quantities of fluid between two points, such as the fueling of an aircraft from a hydrant buried below the surface of the tarmac, are either difficult to maneuver and manipulate, or are not capable of handling flow rates needed to refuel large aircraft. What is needed is an apparatus that has features permitting it to be generally useful for fueling a wide variety aircraft quickly, and can easily accommodate different hydrant positions and aircraft positions. In addition, the apparatus should be easily maneuverable and capable of being easily positioned to make the necessary fluid connections, should be compatible with existing fueling infrastructure, and should be easy to operate.

BRIEF SUMMARY OF THE INVENTION

The present invention provides an apparatus for delivering fluids that addresses the limitations of the prior art and provides for fueling a wide variety aircraft quickly and easily. In accordance with the present invention, a hydrant assembly is provided that overcomes the above-identified problems of prior art fuel-supply coupling arms by enabling greater maneuverability, especially when coupling to a fuel hydrant located in the confines of a subterranean compartment It is an advantage of the present invention to enhance the mobility of a hydrant assembly in relation to a fueling hydrant.

Another advantage of the present invention is to facilitate coupling of a hydrant assembly to a fueling hydrant, where the hydrant occurs in a confined structure, and where the coupling of the hydrant assembly and fueling hydrant occurs in a confined structure.

An additional advantage is to facilitate coupling of a hydrant assembly to a fueling hydrant, where the hydrant is positioned as a subterranean container, and where the coupling of the hydrant assembly and fueling hydrant occurs in a subterranean container.

It is another advantage of the present invention to provide a hydrant assembly for releasably connecting to a hydrant, where the assembly moves according to the rotation of two pairs of swivel joints and the cooperation with curved pipe sections.

It is yet another advantage of the present invention to provide a hydrant assembly for releasably connecting to a hydrant, where the assembly moves in a horizontal plane and a vertical plane.

It is a key aspect of the present invention to provide a hydrant assembly for transferring a fluid through a conduit between a first end connectable to a hydrant and a second end. The assembly includes a platform adapted for moving along the ground and connected to the second end, a first pair of swivel joints rigidly connected and having parallel axes of rotation; and a second pair of swivel joints rigidly connected and having parallel axes of rotation, where one of the first pair of swivel joints is rigidly connected to one of the second pair of swivel joints, and where the parallel axes of rotation of the first pair of swivel joints is perpendicular to the parallel axes of the second pair of swivel joints. In one embodiment, a swivel joint is provided at said second end of said conduit; and a support is provided near said first end of said conduit. The conduit so provided is movable about said swivel joint to a first position where said conduit is extended from said platform and said first end is supported on the ground by said support, and a second position where said conduit is supported by said platform.

It is another aspect of the present invention to provide a hydrant assembly for transferring a fluid through a conduit between a first end connectable to a hydrant and a second end. The assembly includes a platform adapted for moving along the ground and connected to the second end, a first pair of swivel joints rigidly connected, where each of the first pair of swivel joints has an axes of rotation, and where rotation of the first pair of swivel joints moves the first end in a plane vertical to the ground; and a second pair of swivel joints rigidly connected, where each of the second pair of swivel joints has an axes of rotation, where rotation of the second pair of swivel joints moves the first end in a plane horizontal to the ground. In one embodiment of this aspect of the invention, a swivel joint is provided at said second end of said conduit; and a support is provided near said first end of said conduit. The conduit so provided is movable about said swivel joint to a first position where said conduit is extended from said platform and said first end is supported on the ground by said support, and a second position said conduit is supported by said platform.

It is yet another aspect of the present invention to provide a mobile hydrant assembly forming a conduit between a first end connectable to a hydrant and a second end. The assembly includes a platform adapted for moving along the ground and connected to said second end, and a plurality of swivel joints disposed along said conduit to allow said first end to move in two perpendicular directions. One of said plurality of swivel joints is supported by said platform, and the conduit is movable about said swivel joint to a first position and a second position. The first position has the conduit extended from said platform with the first end supported on the ground by said support. The second position has the conduit folded onto and supported by the platform.

A further understanding of the invention can be had from the detailed discussion of specific embodiments below. For purposes of clarity, this discussion refers to devices, methods, and concepts in terms of specific examples. However, the method of the present invention may operate with a wide variety of types of devices. It is therefore intended that the invention not be limited by the discussion of specific embodiments.

Additional objects, advantages, aspects and features of the present invention will become apparent from the description of preferred embodiments, set forth below, which should be taken in conjunction with the accompanying drawings, a brief description of which follows.

BRIEF DESCRIPTION OF THE SEVERAL VIEWS OF THE DRAWING

The invention will be better understood by reference to the following Figures where:

FIG. 1 shows a perspective view of the hydrant assembly of the present invention incorporated into an aircraft fueling system, where the fueling system is in an extended position prior to coupling to a hydrant and a fuel tank;

FIG. 2 shows a perspective view of the hydrant assembly of the present invention incorporated into an aircraft fueling system, where the fueling system is in a collapsed position for storage or transportation;

FIG. 3 shows a perspective view of the hydrant assembly of FIG. 1 where the hydrant coupler is in a raised position;

FIG. 4 shows a perspective view of the hydrant assembly of FIG. 3 lowered for coupling with a hydrant; and FIG. 5 shows side views of two embodiments for pairing swivel joints, where FIG. 5A shows a first embodiment where flow through the joints is turned by 180 degrees, and where FIG. 5B shows a second embodiment where flow through the joints is turned by 0 degrees.

Reference symbols are used in the Figures to indicate certain components, aspects or features shown therein, with reference symbols common to more than one Figure indicating like components, aspects or features shown therein.

DETAILED DESCRIPTION OF THE INVENTION

In order to facilitate its description, the following discussion will describe the present invention in terms of an aircraft fueling system. It will be understood to those of skill in the art, however, that the invention also may be used as a fueling system to provide fuels for other applications, or as a fluid transport system to deliver a fluid between two locations. The invention should therefore not be taken as limited except as provided in the attached claims.

An embodiment of the present invention configured for use as a mobile fueling system for aircraft is shown in FIGS. 1 and 2. As shown in FIG. 1, a fueling system 100 has a hydrant arm 110 that can be adapted for connecting a subterranean hydrant 2, a fueling arm 130 that can be adapted for connecting to a fuel tank inlet 6 on a wing 8 of an aircraft (not shown), and a platform 120 having a platform bed 121 having pipes connecting the hydrant and fueling arms. In general, fueling system 100 includes a conduit to transfer fuel and support structures and ancillary equipment, as described subsequently. The conduit includes, but is not limited to pipes, couplings, fittings, hoses or other hollow or elongated structures allowing a fluid to pass therethrough. The fueling system of the present invention can also be easily arranged in compact configuration for stowing or towing. As shown in FIG. 2 and described subsequently in detail, the portions of hydrant arm 110 and fueling arm 130 proximal to platform 120 include couplings that allow the arms to be rotated onto the platform. The hydrant assembly can thus be folded back onto the platform.

Hydrant arm 110 includes a hydrant assembly 140, an elongated pipe 119, and swivel joints 115 and 117. Hydrant assembly 140 includes a hydrant coupler 111 and a hydrant arm support 113. Fueling arm 130 extends from swivel joint 131 to a fueling coupler 135, and includes a fueling arm support 133. Swivel joints 117 and 131 are secured to platform bed 121, providing support to hydrant arm 110 and fueling arm 130. Also associated with platform bed 121 are at least one pipe 125 providing a conduit between swivel joints 117 and 131. As discussed previously, the pipes, swivel joints and couplers form a part of the conduit for transporting fuel.

Arms 110 and 130 include pipe portions and swivel joints to allow independent manipulation of each arm in both a horizontal and vertical direction. The combination of rigid pipe portions and rotatable swivel joints allows the inventive system to move in several directions. Hydrant arm 110 has swivel joints 115 and 117 joined by a 90 degree pipe section 116, permitting hydrant assembly 140 to be moved horizontally and vertically, and supported on the ground by hydrant arm support 113. Swivel joints 115 and 117 allow for gross placement of hydrant assembly 140 relative to platform 120 and hydrant 2. Thus hydrant arm support 113 can be positioned with two degrees of freedom relative to platform 120: a vertical movement to accommodate variations in the slope of the ground and a horizontal movement to place hydrant assembly 140 an approximate predetermined distance from the platform. In addition, swivel joints 115 and 117 permit hydrant arm 110 to be rotated onto platform 120 as shown in FIG. 2.

It is preferred that support 113 and 133 retract when arms 110 and 130, repectively, are stowed on platform bed 121. It is further preferred that only wheels 129 contact the ground when arms 110 and 130 are in the stowed position, as in FIG. 2. With fueling system 100 thus arranged allows for movement of the system without wear on any part of arm 110 or 130, such as support wheels which might be present, as described subsequently. welded, threaded and other mechanical joints.

Refined or more exact placement of hydrant 140 is provided according to details of hydrant assembly 140 shown in FIG. 3, which shows hydrant coupler 111 in an "up" position, as in FIG. 1, and FIG. 4, which shows the hydrant coupler in a "down" position. Hydrant assembly 140 includes two pairs of swivel joints, with joints 303 and 307 forming a first pair and joints 311 and 315 forming a second pair, two, 180 degree, U-shaped pipe sections 305 and 313, and three, 90-degree, elbow-shaped pipe sections 301, 309, and 317. The pipe section described herein may be individual pipe sections or may be assembled from sub-parts. Thus a U-shaped pipe section could be one pipe section, or it could be assembled from three straight sections joined by two elbow sections, or some other combination. In addition, a curved pipe section could include a continuous curved section from one end to another, or could have straight and curved portions. An important feature for the operation of the swivel joints is orientation of the ends of pipes connecting the swivel joints.

In general, swivel joint 315 is a rotating coupling device that allows the pipe sections adjacent either side of the swivel joint to be rotated through 360 degrees about an axis. In one embodiment of a swivel joint 315 includes a pair of rotating joints, such as joint 315$a$ and 315$c$, a straight section 315$b$, and an internal sleeve to straight section 315$b$ (not shown), all having an axis A, which is also the axis about which swivel joint 315 rotates. Swivel joints 315$a$ and 315$c$ are joined to adjacent pipe sections 313 and 317, respectively. One of joints 315$a$ or 315$c$ is rigidly attached to the internal sleeve and the other joint is rigidly fixed to section 31$b$. Two rows of ball bearings and a set of needle bearings separate the internal sleeve and section 315$b$, allowing rotation and preventing axial movement. Seals are provided with swivel joint 315 to prevent leakage. Although flanged joints are illustrated in the figures, alternatives for joining pipe sections to swivel joints include, but are not limited to, welded, thread and other mechanical joints.

Swivel joint 311 has an axis B and is jointed to swivel joint 315 by U-shaped pipe section 313. Due to the shape of pipe section 313, axis A and B are parallel and are displaced from one another. Rotation about swivel joints 311 and 315 allows the portion of hydrant assembly 140 on either end of these joints to move in a plane. Additionally, the ends of pipe 313 open in the same direction, and thus a flow through hydrant assembly 140 turns through 180degrees. In an alternative embodiment, pipe 313 could turn through 2, 90-degree bends that allow the relative horizontal movement of the various sections, while directing the flow to continue in the same direction, while providing offset. In addition, while the embodiment of FIG. 3 shows a straight section 315$c$, alternative embodiments include curved sections between a pair of swivel joints, and thus rotation about the pair of swivel joints produces an out-of-plane motion of joints.

An example of different swivel joint and pipe segment embodiments are shown in FIG. 5. FIG. 5A shows a first embodiment having a U-shaped pipe segment 505 connecting swivel joints 501 and 503, which is similar to the embodiment of hydrant assembly 140 shown in FIG. 3, while FIG. 5B shows second embodiment having an S-shaped pipe segment 507 connecting swivel joints 501 and 503. Both of the embodiments of FIG. 5 permit sections beyond the swivel joints to move in a predetermined plane. The U-shaped embodiment of FIG. 5A directs the flow back towards the inflow, and is thus more compact than the S-shaped embodiment of FIG. 5B which directs the flow in the same direction as an inflow.

The first pair of swivel joints, 303 and 307 has axes C and D (shown in FIG. 4), respectively and is joined by U-shaped pipe section 305. Rotation about swivel joints 303 and 307 allows the portion of hydrant assembly 140 on either end of these joints to move in a plane. The first pair of swivel joints 303 and 307 is connected to the second pair of swivel joints 311 and.315, restricting the motion of the hydrant assembly 140. Specifically, swivel joints 307 and 311 are connected by elbow-shaped pipe section 309. The connected first and second pair of swivel joints thus cooperate to allow the portions of hydrant assembly 140 on either end to move in each of two perpendicular directions.

Hydrant arm support 113 has a support member 327 which is attached to elongated pipe 119 and a wheel 325 for contacting the ground. A wheel 325 is the preferred contacting member, though non-rotating members could also be used. The configuration of swivel joints and pipe sections as shown in FIG. 3 thus permit the hydrant coupler 111 to move vertically by rotation of one or both of the first pair of swivel joints 303 and 307, and to move horizontally by rotation of one or both of the second pair of swivel joints 311 and 315. Movement of hydrant assembly 140 in a vertical plane (that is, with or against gravity) is assisted, in the embodiment shown, by a balance mechanism 321 and beam 323. These components are connected between pipe segment 305 and either the portion of swivel joint 311 closest to pipe segement 305, or a pipe segement rigidly attached to that part of swivel joint 311, such as pipe segment 309. Balance mechanism 321 and beam 323 thus attached facilitate the raising and lowering of the hydrant assembly. In the illustrated embodiment, beam 323 is connected to pipe segment 305. In an alternative embodiment, beam 323 is connected to swivel joint 303 at the portion rigidly attached to pipe segment 305.

FIG. 3 shows hydrant coupler 111 in an "up" position. The movement of hydrant assembly 140 vertically resulting from rotation of the first pair of swivel joints 303 and 307 is illustrated in FIG. 4, which shows the hydrant coupler 111 in a "down" position. Specifically, swivel joints 303 and 307 have been rotated from the "up" position of FIG. 3 by rotating swivel joint 307 to lower swivel joint 303 and hydrant coupler 111 in a vertical plane, towards the ground. In addition, swivel joint 303 has rotated due to the weight of hydrant coupler 111 to maintain the vertical orientation of the hydrant coupler. It is an advantage of the present invention that the sequential placement of swivel joints and pipe sections as shown in FIGS. 3 and 4 permit hydrant coupler 111 to be easily rotated below the ground on which hydrant arm support 113 rests. Thus hydrant assembly 140 can easily reach subterranean hydrants as are commonly placed below the tarmac for fueling aircraft.

In an alternative embodiment, hydrant assembly 140 includes a hydrant coupler 111 that is a fuel truck compatible coupler. Fuel is the received with hydrant coupler 111 oriented horizontally for easy connection to a fueling truck.

Fueling arm 130 has a fueling arm support 133 and contains swivel joints and curved pipe sections that cooperate to allow horizontal and vertical movement of the fueling arm in a manner similar to that described in conjunction with hydrant arm 110. The portion of fueling arm 130 proximal to platform 120 includes a pair of swivel joints 131 and 132 that cooperate with the pipe sections to allow for the same movement as the hydrant arm: vertical movement for uneven ground while being supported by fueling arm support 133, horizontal movement to provide gross placement of the fueling arm support, and a range of motion for placing the fueling arm on platform 120, as shown in FIG. 2. Fueling arm 130 can also include a balancing mechanism (not shown) and swivel joints and pipe segments to allow fuel coupler 135 to reach fuel tank inlet 6.

Platform 120 has a platform bed 121 to support piping to provide fluid communication between swivel joints 117 and 131. Platform bed 121 can also be used to mount and include ancillary equipment 123 to assist or measure flow such as pumps, valves and gauges. The various pieces of piping and equipment on platform bed 121 are arranged to allow for receiving hydrant arm 110 and fueling arm 130, as shown in FIG. 2. Platform 120 also has a plurality of wheels 129 and a towing hitch 127 to provide support for the platform on the ground and to provide mobility of the platform along the ground, and may include brakes or wheel locks (not shown) to-proyide a stable platform for fueling operations or storing the fueling system. As described platform 120 is a towed platform. Alternatively, platform 120 can be self-propelled by including include means for powering wheels 129 and a steering mechanism.

Fueling of an aircraft is accomplished as follows. Fueling system 100 configured as in FIG. 2 is towed to the vicinity of hydrant 2 and fuel tank inlet 6. The plurality of swivel joints allows for great flexibility in the relative spacing of the hydrant and tank. It is preferred that the hydrant and tank are separated by slightly more than the sum of the length of hydrant arm 110, platform 120, and fueling arm 130 from the platform to fueling arm support 133, as shown in FIG. 1. For this hydrant-to-tank spacing, the platform is aligned and placed intermediate to the hydrant and tank, as shown in FIG. 1. If the hydrant and tank are much closer than the length of hydrant arm 110 and fueling arm 130, for example, having a spacing equal to the length of platform 120, then the platform can be placed perpendicular to a line formed between the hydrant and tank, and the hydrant and fueling arms can be oriented approximately perpendicular to the length of the platform. Hydrant arm 110 and fueling arm 130 are then folded off of platform 120, with hydrant arm support 113 near hydrant 2 and fueling arm support 133 on the ground below and to the side of fuel tank inlet 6 Fuel coupler 135 is then attached to fuel tank inlet 6, and hydrant assembly 140 is lowered onto hydrant 6, for example as shown in FIGS. 3 and 4. With a conduit formed between hydrant 2 and fuel tank inlet 6, ancillary equipment 123 is then actuated to permit the flow of fuel from the hydrant to the fuel tank inlet.

During the movement of the various portion of fueling system 100, the swivel joints should be rigidly connected. The pipe sections and swivel joints described herein may thus be permanently attached or rigidly connected or attached from components using techniques that allow for connecting or disconnecting or that may be easily releasable. The use of connections that can be disconnected may aid in the cleaning, repairing, or transport of the arms and platform of the system, or may allow for the arms or platform to be used in combination with other components or for other uses.

The swivel joints and pipe sections may thus be formed into integral components, or may be joined using methods that permit removal or detachment, such as by threading or through bolted joints, or may be joined with more easily removable connectors. Thus, for example, in one embodiment swivel joint 315 can be uncoupled at section 315 or through coupling at pipe segments 313 or 317, to permit hydrant assembly 140 to be connected to another platform or piping system, or allow for servicing of the hydrant assembly. Alternatively, hydrant assembly 140 may be attached to a fixed pipeline instead of a mobile platform.

In another embodiment, hydrant coupler 111 is adapted to allow the releasable attachment to a fueling hydrant, and in yet another embodiment hydrant coupler 111 is adapted to allow the releasable attachment to a mobile pipe or to a fueling truck (not shown). In yet another embodiment, swivel joint 315 is permanently attached to a pipe or conduit, allowing the fuel to be transferred from hydrant coupler 111 to the pipe or conduit.

The invention has now been explained with regard to specific embodiments. Variations on these embodiments and other embodiments may be apparent to those of skill in the art. It is therefore intended that the invention not be limited by the discussion of specific embodiments. It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference in their entirety for all purposes.

What is claimed:

1. A mobile fueling assembly forming a conduit between a first end and a second end, said assembly comprising:
    a platform adapted for moving along the ground and connected to said conduit;
    a first pair of swivel joints forming part of said conduit between said first end and said platform,
    where said first pair of swivel joints are rigidly connected and have parallel axes of rotation; and
    a second pair of swivel joints forming part of said conduit between said first end and said platform, where said second pair of swivel joints are rigidly connected and have parallel axes of rotation,
    where one of said first pair of swivel joints is rigidly connected to one of said second pair of swivel joints, and where said parallel axes of rotation of said first pair of swivel joints are perpendicular to said parallel axes of said second pair of swivel joints.

2. The mobile fueling assembly of claim 1, wherein said first end includes a releasably coupleable hydrant connector.

3. The mobile fueling assembly of claim 1, wherein said first end includes a releasably coupleable fuel dispensing connector.

4. The mobile fueling assembly of claim 1, wherein rotation of said first pair of swivel joints moves said first end in a plane vertical to the ground, and wherein rotation of said second pair of swivel joints moves said first end in a plane horizontal to the ground.

5. The mobile fueling assembly of claim 4, wherein rotation of said first pair of swivel joints provides for said first end to translate below the level of the ground.

6. The mobile fueling assembly of claim 4, wherein the conduit adjacent to each of said first pair of swivel joints opens in approximately the same direction.

7. The mobile fueling assembly of claim 4, wherein the conduit adjacent to each of said first pair of swivel joints opens in approximately opposite directions.

8. The mobile fueling assembly of claim 4, wherein the conduit adjacent to each of said second pair swivel joints opens in approximately the same direction.

9. The mobile fueling assembly of claim 4, wherein the conduit adjacent to each of said second pair of swivel joints opens in approximately opposite directions.

10. The mobile fueling assembly of claim 4, wherein the conduit adjacent to each of said first pair of swivel joints opens in approximately the same direction, wherein the conduit adjacent to each of said second pair of swivel joints open in approximately the same direction, and wherein the axis of rotation of one of said fist pair of swivel joints is perpendicular to the axis of rotation of one of said second pair of swivel joints.

11. The mobile assembly of claim 1, further including a means for counterbalancing the weight of conduit extending from said first end to said first pair of swivel joints, such that the force required to raise said first end against gravity is less than said weight.

12. The mobile fueling assembly of claim 4, further including sequentially disposed along the length of said assembly: 1) said first end, 2) said first pair of swivel joints, 3) said second pair of swivel joints, and 4) said platform.

13. The mobile fueling assembly of claim 4, further including sequentially disposed along the length of said assembly: 1) said first end, 2) said second pair of swivel joints, 3) said first pair of swivel joints, and 4) said platform.

14. The mobile fueling assembly of claim 1, wherein said platform has mounted thereon a fluid handling component in fluid communication with said first end, wherein said fluid handling components is selected from the group consisting of a pump, a valve, or any combination thereof.

15. The mobile fueling assembly of claim 1, further comprising:
    a swivel joint at said second end of said conduit; and
    a support near said first end of said conduit,
    where said conduit is movable about said swivel joint to
        a first position where said conduit is extended from said platform and said first end is supported on the ground by said support, and
        a second position where said conduit is supported by said platform to facilitate transport or storage of the mobile fueling assembly.

16. The mobile fueling assembly of claim 2, wherein said second end includes at least one swivel joint and a releasably coupleable fuel dispensing connector.

17. The mobile fueling assembly of claim 16, wherein the portion of said at least one swivel joint includes
    a third pair of swivel joints forming part of said conduit between said platform and said second end, where said third pair of swivel joints are rigidly connected and have parallel axes of rotation; and
    a fourth pair of swivel joints forming part of said conduit between said platform and said second end, where said fourth pair of swivel joints are rigidly connected and have parallel axes of rotation,
    where one of said third pair of swivel joints is rigidly connected to one of said fourth pair of swivel joints, and where said axes of rotation of said third pair of swivel joints are perpendicular to said axes of rotation of said fourth pair of swivel joints.

18. A mobile fueling assembly for forming a conduit between a first end and a second end, said assembly comprising:
    a platform adapted for moving along the ground and connected to the conduit;
    a first pair of swivel joints forming part of said conduit between said first end and said platform,
    where said first pair of swivel joints are rigidly connected, where each of said first pair of swivel joints has an axis of rotation, and where rotation of said first pair of swivel joints moves said first end in a plane vertical to the ground; and
    a second pair of swivel joints forming part of said conduit between said first end and said platform, where said second pair of swivel joints are rigidly connected, where each of said second pair of swivel joints has an axis of rotation, and where rotation of said second pair of swivel joints moves said first end in a plane horizontal to the ground.

19. The mobile fueling assembly of claim 18, wherein said conduit includes, sequentially disposed along the length thereof: 1) said first end, 2) said first pair of swivel joints, 3) said second pair of swivel joints, and 4) said platform.

20. The mobile fueling assembly of claim 18, wherein said first end includes a releasably coupleable hydrant connector.

21. The mobile fueling assembly of claim 18, wherein rotation of said first pair of swivel joints provides for said first end to translate below the level of the ground.

22. The mobile fueling assembly of claim 18, wherein the conduit adjacent to each of said first pair of swivel joints opens in approximately the same direction.

23. The mobile fueling assembly of claim 18, wherein the conduit adjacent to each of said second pair of swivel joints opens in approximately the same direction.

24. The mobile fueling assembly of claim 18, wherein the conduit adjacent to each of said first pair of swivel joints opens in approximately the same direction, and wherein the conduit adjacent to each of said second pair of swivel joints opens in approximately the same direction.

25. The mobile fueling assembly of claim 18, further including a means for counterbalancing the weight of the hydrant assembly extending from said first end to said first pair of swivel joints, such that the force required to raise said first end is less than said weight.

26. The mobile fueling assembly of claim 18, further comprising:
   a swivel joint at said second end of said conduit; and
   a support near said first end of said conduit,
   where said conduit is movable about said swivel joint to
      a first position where said conduit is extended from said platform and said first end is supported on the ground by said support, and
      a second position where said conduit is supported by said platform to facilitate transport or storage of the mobile fueling assembly.

27. The mobile fueling assembly of claim 18, wherein said first end includes a releasably coupleable fuel dispensing connector.

28. The mobile fueling assembly of claim 20, wherein said second end includes at least one swivel joint and a releasably coupleable fuel dispensing connector.

29. The mobile fueling assembly of claim 28, wherein the portion of said at least one swivel joint includes:
   a third pair of swivel joints forming part of said conduit between said platform and said second end, where said third pair of swivel joints are rigidly connected, where each of said third pair of swivel joints has an axis of rotation, and where rotation of said third pair of swivel joints moves said first end in a plane vertical to the ground; and
   a fourth pair of swivel joints forming part of said conduit between said platform and said second end, where said fourth pair of swivel joints are rigidly connected, where each of said fourth pair of swivel joints has an axis of rotation, and where rotation of said fourth pair of swivel joints moves said first end in a plane horizontal to the ground.

30. A mobile fueling assembly forming a conduit between a first end connectable to a hydrant and a second end, said assembly comprising:
   a support near said first end of said conduit;
   a platform adapted for moving along the ground and connected to said conduit so that said platform provides support to facilitate transport or storage of said mobile fueling assembly when said conduit is supported by said platform; and
   a plurality of swivel joints disposed along said conduit to allow said first end to move in two perpendicular directions,
   where one of said plurality of swivel joints is supported by said platform, and where said conduit is movable about said swivel joint to a first position where said conduit is extended from said platform and said first end is supported on the ground by said support, and a second position where said conduit is folded onto said platform.

\* \* \* \* \*